United States Patent [19]
Bowyer et al.

[11] Patent Number: 5,646,458
[45] Date of Patent: Jul. 8, 1997

[54] UNINTERRUPTIBLE POWER SYSTEM WITH A FLYWHEEL-DRIVEN SOURCE OF STANDBY POWER

[75] Inventors: Richard N. Bowyer, Pasadena; Geoffrey West, Irvine, both of Calif.

[73] Assignee: Atlas Energy Systems, Inc., South El Monte, Calif.

[21] Appl. No.: 603,855

[22] Filed: Feb. 22, 1996

[51] Int. Cl.$^6$ .................................................. H02J 9/08
[52] U.S. Cl. .................. 307/67; 307/64; 310/153; 318/150; 318/161; 290/4 A; 290/4 R
[58] Field of Search .................. 307/64, 67, 68; 290/4 R, 4 A; 310/10, 153; 318/150, 161

[56] References Cited

U.S. PATENT DOCUMENTS

| | | | |
|---|---|---|---|
| 2,783,393 | 2/1957 | Lindahl et al. | 307/64 |
| 3,296,451 | 1/1967 | Van Ausdal et al. | 290/4 |
| 3,315,148 | 4/1967 | Grillo | 322/4 |
| 3,477,013 | 11/1969 | Smith | 322/4 |
| 3,558,901 | 1/1971 | Jacobus | 290/30 |
| 3,609,426 | 9/1971 | Gaul | 310/112 |
| 4,035,659 | 7/1977 | Jeppson | 307/84 |
| 4,406,950 | 9/1983 | Roesel, Jr. | 290/4 |
| 4,412,170 | 10/1983 | Roesel | 322/4 |
| 4,439,720 | 3/1984 | Georges | 322/4 |
| 4,460,834 | 7/1984 | Gottfried | 307/64 |
| 4,657,117 | 4/1987 | Lauer | 187/114 |
| 4,686,375 | 8/1987 | Gottfried | 290/2 |
| 4,827,152 | 5/1989 | Farkas | 307/68 |
| 4,857,755 | 8/1989 | Comstock | 3007/47 |
| 4,926,107 | 5/1990 | Pinson | 322/4 |
| 5,053,635 | 10/1991 | West | 307/37 |
| 5,081,368 | 1/1992 | West | 307/67 |
| 5,198,698 | 3/1993 | Paul et al. | 307/64 |

OTHER PUBLICATIONS

"Ride–Through Power Supplies", 6 pages, G.E. Corporation, Nov. 10, 1975.

*Primary Examiner*—William M. Shoop, Jr.
*Assistant Examiner*—Albert W. Paladini
*Attorney, Agent, or Firm*—Baker, Maxham, Jester & Meador

[57] ABSTRACT

An UPS (uninterruptible power system) includes an UPS power conditioning unit that provides conditioned AC power to a critical load. The UPS power conditioning unit includes a variable speed drive that operates in response to AC utility power or to a standby DC input by providing a motor drive signal. The UPS power conditioning unit further includes a motor-generator that operates in response to the motor drive output by providing the conditioned AC power to the critical load. In response to an outage in the utility AC power, standby DC power is provided by a standby DC power source that includes a variable speed drive and a flywheel motor-generator connected to the variable speed drive. Both the UPS power conditioning unit and the standby DC power source are initially operated in response to the utility AC power, the flywheel motor-generator storing kinetic energy in a rotating flywheel. When an outage occurs, the rotating flywheel continues to operate the flywheel motor-generator of the standby DC power source, causing the production of AC power which is rectified and provided as standby DC power to operate the variable speed drive of the UPS power conditioning unit until either the utility AC power outage is over or a standby emergency generator is brought on line.

20 Claims, 4 Drawing Sheets

UNINTERRUPTIBLE POWER SYSTEM WITH A FLYWHEEL-DRIVEN SOURCE OF STANDBY POWER

BACKGROUND OF THE INVENTION

The invention concerns an UPS (uninterruptible power system) without standby batteries, and more particularly, an UPS in which standby DC power is obtained from a flywheel-driven motor generator set.

Uninterruptible power systems specifically include batteries to provide DC power that keep the UPS operating when utility AC power is interrupted. The short amount of time that DC power must be provided is determined either by the duration of the utility AC power outage or by the length of time necessary to turn on and bring a standby generator up to speed. In the latter case, AC power generated by the standby emergency generator substitutes for the utility AC power.

It is well known that batteries are unreliable and subject to frequent, unpredictable failure. Further, when used to provide standby DC power in an UPS, batteries require constant monitoring and maintenance during their effective lifetimes and replacement when their effective lifetimes expire. For these reasons alone, batteries constitute an undesirable element of an UPS.

Further, most failures of utility AC power are of short duration, lasting only for a few cycles or a few seconds. Longer outages typically last for an extended period and may approach several hours in duration. Most UPS's include a standby emergency generator set that will typically start and attain operating performance levels within a period of ten seconds or less after failure of a utility AC power signal. Thus, the maximum time that an UPS runs on DC power provided by batteries is that 10-second period. In order to meet the load requirements of an UPS, battery systems are typically rated for a minimum of five minutes—4 minutes and 50 seconds longer than necessary.

Accordingly, there is manifold motivation for replacing batteries in an UPS system.

SUMMARY OF THE INVENTION

The invention springs from the inventors' realization that enough kinetic energy can be stored in a flywheel to provide the DC power necessary to maintain UPS operation during the brief period of time required to switch over to a standby emergency generator.

The inventors have further realized that removal of the flywheel to a standby power source that is physically separate from the UPS significantly reduces the size of the flywheel necessary to provide the required DC power. When compared with the size of a flywheel that would be directly mechanically coupled to the generator of an UPS, the inventors realized that their invention would enable the use of much smaller flywheels that would enable an UPS to continue operation long enough for the standby emergency generator set to start, transfer online, and pick up the load.

Accordingly, it is an objective of this invention to provide standby DC power to an UPS from a flywheel mechanism that is physically separate from, and rotationally unconnected to the primary generator of the UPS.

It is a further objective to provide an UPS that receives standby DC power produced in response to kinetic energy stored in a flywheel that is rotationally separate from the main power components of the UPS.

These and other objectives and advantages of the invention will be manifest when the Detailed Description is read with reference to the drawings.

DETAILED DESCRIPTION OF THE PREFERRED EMBODIMENTS

U.S. Pat. Nos. 5,053,635 and 5,081,368, both assigned to the assignee of this application, disclose in detail the structure and operation of an UPS with a power conditioner including a variable speed drive coupled to control the operation of a motor-generator pair. In this regard, a variable speed drive receives as an input, utility AC power, conditioning the power to provide a pulse-modulated base drive control to a three-phase inverter. The three-phase inverter includes a transistor/inverter module to which power is provided on a DC bus internal to the variable speed drive. In typical operation, the DC power on the DC bus is provided through a bridge rectifier in the variable speed drive which rectifies the input AC power. As is known, such a variable speed drive includes provision for coupling DC power to the DC power bus from an external DC source. The incorporated patents disclose in detail an UPS that uses this external connection to the DC bus of a variable speed drive to provide standby DC power when the utility AC power is interrupted. Provision of the DC power enables the variable speed drive to continue to provide a motor drive signal to the motor-generator pair so that power to a critical load from the generator of the motor-generator pair is continuous, even during utility AC power interruptions.

Figure 1:
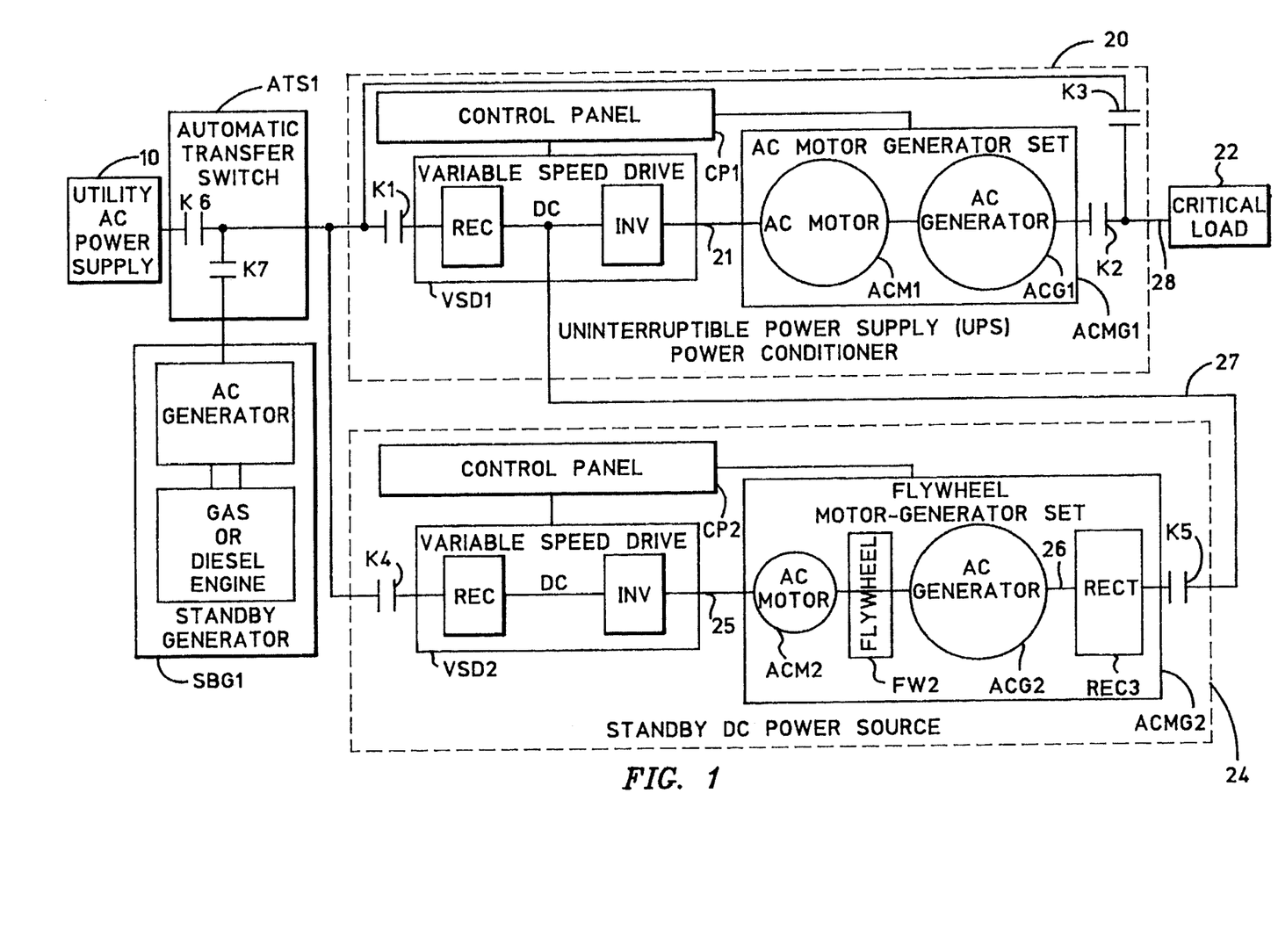
FIG. 1 is a block diagram illustrating an uninterruptible power system (UPS) according to the invention.

FIG. 1 illustrates an UPS that includes a variable speed drive/motor generator pair configured to provide conditioned, uninterruptible AC power to a critical load as taught in the incorporated patents. Thus, in FIG. 1, an UPS power conditioner 20 includes a variable speed drive VSD1 that generates a motor drive signal at 21 that is provided as an input to an AC motor-generator set ACMG1. The set ACMG1 includes an AC motor ACM1 and an AC generator ACG1. The AC motor ACM1 is rotationally coupled by a drive shaft to the AC generator ACG1. When the motor drive signal on 21 is active, it causes the AC motor ACM1 to operate and drive the AC generator ACG1. The AC generator ACG1 produces an AC signal that is provided to a critical load 22. Utility AC power is provided from a supply 10 through an automatic transfer switch ATS1 to the UPS power conditioner 20, where it is input to the variable speed drive VSD1. Also connected to the automatic transfer switch ATS1 is a standby generator SBG1 including an engine rotationally coupled to an AC generator. When an interruption in the utility AC power provided by supply 10 having a predetermined duration is detected by the switch ATS1, the switch ATS1 decouples the supply 10 from the input to the UPS power conditioner 20, and couples the standby generator SBSG1 to the input. In this manner, for interruptions to the utility AC power of longer duration, standby AC power is provided to the UPS power conditioner 20 from the standby generator at SBG1 through the switch ATS1. During short interruptions to the utility AC power and during switch-over to the standby generator SBG1, standby DC power is provided to the variable speed drive VSD1 from a standby DC power source 24.

The standby DC power source 24 includes a variable speed drive VSD2 connected to the switch ATS1 which provides to it AC power either from the supply 10 or the generator SBG1. In response, the variable speed drive VSD2 generates a motor drive signal at 25 provided as a drive input to an AC motor ACM2 that is part of flywheel motor-generator set ACMG2. The set ACMG2 includes, in addition to the AC motor ACM2, a flywheel FW2, and an AC generator ACG2. A rectifier REC3 receives the AC power produced by the generator ACG2. The AC motor ACM2 rotates a drive shaft to which the flywheel FW2 and AC generator ACG2 are connected for rotational operation with the AC motor ACM2. In response to rotation of either the AC motor ACM2 or the flywheel FW2, the AC generator ACG2 is caused to generate an AC signal at 26 that is rectified by the rectifier REC3. The output of the rectifier REC3 is provided as a standby DC power signal on signal line 27 that is connected to the DC bus DC1 of the variable speed drive VSD1. The standby DC power source includes other components and controls explained in greater detail below.

In operation, utility AC power from the supply 10 passes through the switch ATS1 to the drive VSD1 which produces the motor drive signal at 21 to drive the set ACGM1. AC power output from the UPS power conditioner 20 is provided through a contact K2 on an output 28 to the critical load 22.

The same AC power passing through switch ATS1 to the conditioner 20 also passes to the drive VSD2 of the standby DC power source 24. Preferably, the variable speed drive VSD2 is approximately one-tenth the size of the variable speed drive VSD1, due to the fact that its only purpose is to power a small AC induction motor (AC motor ACM2) that drives a heavy flywheel (the flywheel FW2) and AC generator ACG2. Preferably, the variable speed drive VSD2 brings the motor ACM2, the flywheel FW2, and the generator ACG2 up to full speed over an extended period of time so as not to overload the drive VSD2.

Kinetic energy equal to the power required to drive the UPS power conditioner 20 under full load for 15 seconds is stored in the flywheel FW2 when it is rotating at full speed. At a time when full AC output power is available from the generator ACG2, it is rectified by a full bridge rectifier (the rectifier REC3). During normal operation of the standby DC power source 24, the contactor K5 closes, allowing the DC output from the rectifier REC3 to be conducted on the signal line 27 to the DC bus of the variable speed drive VSD1. At a time when the UPS illustrated in FIG. 1 is "on line", being powered by the utility AC power supply 10 and supplying condition AC power to the critical load 22, if the utility AC power should fail for a period longer than one second, the automatic transfer switch ATS1 signals the standby generator SBG1 to run up to full rated speed and voltage. Following run up of the standby generator SG1, the automatic transfer switch ATS1 transfers the UPS of FIG. 1 to the standby AC power produced by the generator SBG1 by opening contactor K6 and closing contactor K7. During this period of time, when no AC power is available to the input of the variable speed drive VSD1, the kinetic energy stored in the flywheel FW2 drives the AC generator ACG2 at full rated power and the rectifier REC3 supplies full rated DC power to the DC bus of the variable speed drive VSD1. Consequently, the UPS power conditioner 20 continues to power the critical load 22. The kinetic energy stored in the flywheel FW2, therefore, powers the UPS power conditioner 20 under full rated load until the standby generator SBG1 is powering the UPS of FIG. 1.

Upon return of utility AC power, the automatic transfer switch ATS1 monitors the stability of the AC power and, when stabilized for a period of ten consecutive seconds, opens the contactor K7 and closes the contactor K6, thus transferring the UPS back to the utility AC power provided by the supply 10. After transfer back to the utility AC power supply 10, the switch ATS1 signals the standby generator SBG1 to continue operating for ten minutes during a "cool down" period, after which the generator SBG1 stops and assumes a ready state for any further interruptions in the utility AC power. At this time, the flywheel motor-generator set ACMG2 of the standby DC power source is powered back up to full speed and voltage and stands by in readiness for any further interruption of the utility AC power.

SEQUENCE OF OPERATION

Figure 2:
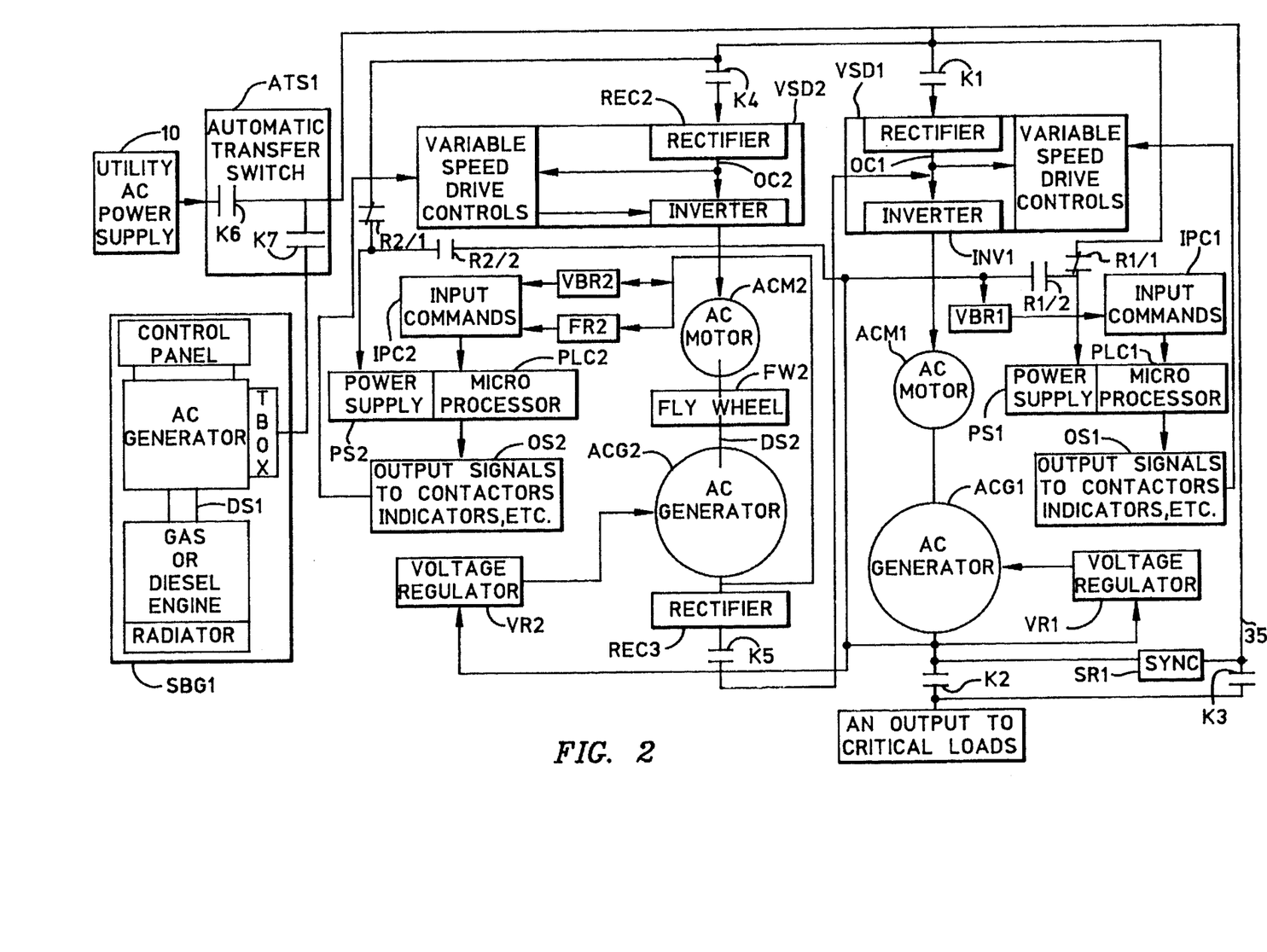
FIG. 2 is a more detailed block diagram of the UPS of FIG. 1 including control elements for implementing method steps according to the invention.
Figure 3:
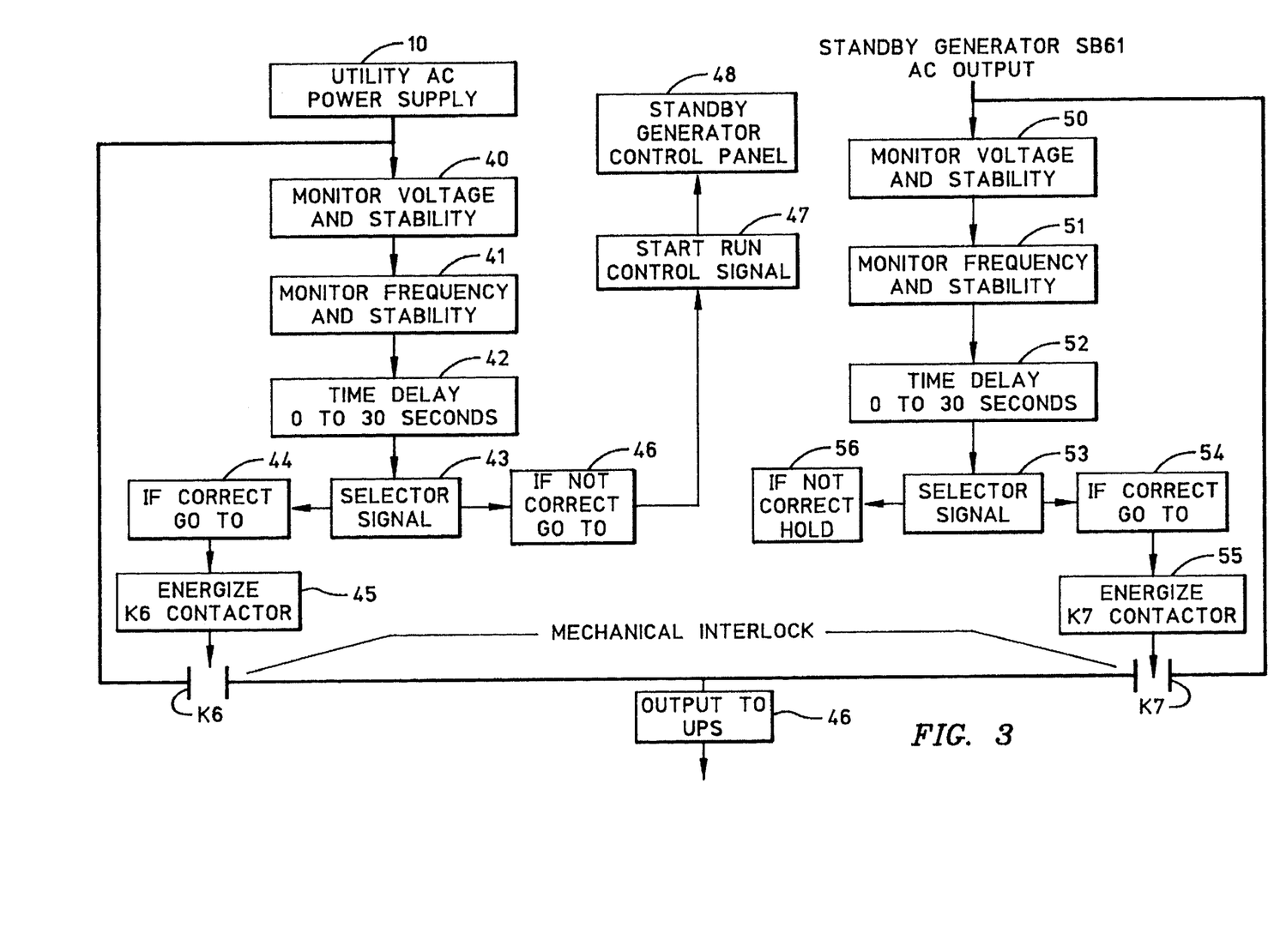
FIG. 3 is a flow diagram illustrating control of an automatic transfer switch in the operation of the invention.

Refer now to FIGS. 2 and 3 for a more detailed illustration and explanation of the structure and operation of the UPS of FIG. 1.

With reference to the automatic transfer switch ATS1, and to the operational sequence illustrated in FIG. 3, the switch is conventional and includes an electronic monitoring unit that senses utility AC power. If utility AC power is available and within preprogrammed settings of the electronic monitoring unit, the unit in the switch ATS1 signals closure of the contactor K6, connecting the utility AC power to the UPS. The utility AC power passes to a relay R1 having a normally closed contact (R1/1) and a normally open contact (R1/2). The utility AC power passes across the normally closed contact R1/1 to a microprocessor PLC1 and other control circuits in the UPS power conditioner 20. Assuming automatic operation of the UPS power conditioner 20, a program in the processor PLC1 checks the status of the UPS power conditioner 20. With the UPS power conditioner 20 not operating at this time, the program of the processor PLC1 energizes contactor K3, closing all K3 contacts. The main K3 contacts provide the utility AC power directly to the critical load. This mode of operation is referred to as synchronous bypass.

With the operational mode identified as synchronous bypass, the program of the microprocessor PLC1 closes the contacts of the contactor K1, allowing the utility AC power to pass to the rectifier REC1 in the variable speed drive VSD1, which provides DC power on the bus DC1. DC power from the DC bus DC1 also passes to other components of the variable speed drive VSD1. Next, the microprocessor PLC1 signals the variable speed drive VSD1 to start and bring the AC motor/generator set (ACM1, ACG1) up to full speed and frequency. A voltage regulator VR1 automatically excites the main field winding of the generator ACG1, causing the generator to produce a clean, regulated, sinusoidal AC power output. A voltage buildup relay VBR1 signals the microprocessor PLC1 when the output of the generator ACG1 satisfies a predetermined specification respecting voltage, frequency, and waveform quality, thereby initiating execution of a synchronization function. The synchronization function, which can be understood with reference to the incorporated patents, is performed by means of a synchronization relay SR1 which monitors the sine waves of both the utility AC power on the bypass 35 and the output from the generator ACG1. When synchronism between the AC power waveforms occurs, the synchronization relay SR1 signals the microprocessor PLC1, causing the microprocessor to close the contactor K2, whereby both the utility AC power and the output of the generator ACG1 are connected to the critical load.

After a programmed amount of time, preferably 30 milliseconds, the microprocessor PLC1 causes the contactor K3 to open, thereby disconnecting the utility AC power from the critical load and from the output of the generator ACG1.

The UPS power conditioner 20 now carries the critical load. The microprocessor PLC1 signals the R1/1 contact to open and the R1/2 contact to close, thereby transferring all AC control circuits from utility AC power to the output of the generator ACG1. This action allows the UPS power conditioner 20 to operate continuously and without interruption to the critical load during momentary or longer duration power failures or disturbances.

STANDBY DC POWER SOURCE

Initially, AC control power is fed to the standby DC power source 24 through the normally closed contact R2/1 of relay R2, providing power to the standby DC power source microprocessor PLC2 and all other AC control circuits in the standby DC power source.

Assuming automatic operation, a program in the microprocessor PLC2 signals the contactor K4 to close, thereby allowing utility AC power to pass to the full bridge power rectifier REC2 of the variable speed drive VSD2. This provides DC power on a DC power bus DC2 in the drive VSD2, which powers the inverter and controls of the variable speed drive VSD2. Preferably, the variable speed drive VSD2 is approximately 1/10 the size of the variable speed drive VSD1, since the drive VSD2 is used only for powering a small AC induction motor (ACM2), a flywheel FW2, and an AC generator ACG2. A drive shaft DS2 couples the AC motor ACM2, the flywheel FW2, and the AC generator ACG2 for common rotary operation in which, when the AC motor ACM2 operates, it drives the flywheel FW2 and the AC generator ACG2. The AC motor ACM2 operates in response to the motor drive signal output by the variable speed drive VSD2. When the motor drive signal is interrupted, the drive shaft DS2 continues to be rotated by the kinetic energy stored in the flywheel FW2, thereby continuing to drive the AC generator ACG2.

Continuing with the description of the startup of the standby DC power source 24, when it senses provision of power to its own power supply PS2, the microprocessor PLC1 signals the variable speed drive VSD2 to begin powering the AC motor ACM2, which spins the flywheel FW2 and the AC generator ACG2 by way of the drive shaft DS2. The motor, flywheel, and generator are slowly brought up to a preprogrammed speed. A voltage regulator VR2 is connected to the output of the AC generator ACG1, which is connected to the critical load, and seeks to regulate that voltage by exciting the main field winding of the AC generator ACG2 in the standby DC power source 24. The AC generator ACG2 produces a preprogrammed AC voltage output which is connected to a power rectifier REC3. A voltage buildup relay VBR2 signals the microprocessor PLC2 when the output voltage of the generator ACG2 is at a predetermined level, after which the microprocessor PLC3 signals the contactor K5 to energize, closing its main contacts and allowing a DC current to pass to the DC bus DC2 of the variable speed drive VSD1. The microprocessor PLC2 signals the relay R2, opening relay contact R2/1 and closing relay contact R2/2, thus passing all control circuits over to the AC output of the generator ACG1. This action allows all control circuits in the standby DC power source 24 to continue operation during a loss of utility AC power.

Assuming a standby mode for the standby generator set SBG1, and with both the UPS power conditioner 20 and the standby DC power source 24 running, the conditioned AC power produced by the UPS power conditioner 20 is connected to the critical load, and the UPS of FIGS. 1 and 2 is now "on line".

LOSS OF UTILITY AC POWER

Assume an interruption, loss, or unacceptable mutation in the waveform of the utility AC power, any of which are detected and monitored by the switch ATS1. Assuming that the switch ATS1 is programmed to act in response to a utility AC power interruption having a duration of one second or longer, and assuming detection of such an interruption, the switch ATS1 signals the standby generator SBG1 to start and run up to full rated voltage output. At that point, the switch ATS1 opens the contactor K6 and closes the contactor K7, thereby removing the utility AC power from the input to the UPS power conditioner 20 and the standby DC generator 24. Closure of the contactor K7 allows the standby generator SBG1 to accept the system load. Assuming a maximum run up time for the standby generator SBG1 of 15 seconds, it will be appreciated that the kinetic energy stored in the flywheel FW2 must be sufficient to continue the operation of the UPS power conditioner 20 for a period of time in the range of one second to 15 seconds. During this period, with the flywheel FW2 driving the AC generator ACG2, the AC output from the generator is rectified at REC3 and a DC current is provided to the DC bus DC1 of the variable speed drive VSD1, thereby permitting the drive to continue operation that includes generation of a motor drive signal provided to the AC motor ACM1.

The kinetic energy from the flywheel FW2 being converted into electrical energy by the AC generator ACG2 must be capable of powering the total critical load by way of the UPS power conditioner 20 for a period of time of up to 15 seconds. While this occurs, both of the contactors K1 and K4 on the input side of the UPS power conditioner 20 and the standby DC power source 24 remain closed, being powered by the output of the AC generator ACG1 and stand ready to pass the output power from the standby generator SBG1 to both units on closure of the contactor K7. When the contactor K7 closes, the standby AC power output by the generator SBG1 passes across the contacts of the contactor K7 to power both the UPS power conditioner 20 and the standby DC source 24. The UPS power conditioner 20 receiving standby AC power from the standby generator SBG1 powers the critical load without the use of the kinetic energy from the flywheel FW2. The variable speed drive VSD2 now receives the standby AC power from the standby generator SBG1 and engages in a "speed search" before bringing the AC motor ACM2, flywheel FW2, and generator ACG2 back up to full programmed speed and voltage.

Standby generator SBG1 continues to power the total system until a time when the utility AC power returns.

RETURN OF UTILITY AC POWER

Upon return of the utility AC power from the source 10, the automatic transfer switch ATS1 monitors the utility AC power, checking for input stability. If the utility AC power is found to be stable and within programmed parameters of voltage and frequency for a period of, preferably, 30 seconds, the electronic monitoring unit of the switch ATS1 signals the contactor K7 to open and closes the contactor K6. Now, the standby generator SBG1 continues to run without a load for a "cool down" period. The utility AC power supply 10 now powers both the UPS power conditioner 20 and the standby DC power source 24, and therethrough the critical load. After a predetermined period, preferably 10 minutes, the switch ATS1 signals the standby generator SBG1 to cease operation and prepares for any further interruptions in the utility AC power source. The UPS system of FIGS. 1 and 2 is now back "on line".

MANUAL PROCEDURES

The inventors contemplate the operation of the UPS illustrated in FIGS. 1 and 2 by manual start/stop procedures by means of one or more control panels to control settings of contactors K1–K5.

FLYWHEEL KINETIC ENERGY CONSIDERATIONS

The inventors have determined, after extensive start testing of a gasoline and diesel generator set that the standby generator SBG1 can be started, brought up to full rated speed and full output voltage with a full rated load applied to the output of the generator SBG1 within 15 seconds. The inventors have, therefore, determined that, from the instant utility AC power source is lost, 15 seconds are available to apply a secondary AC power source to the UPS system. During this period, the critical load has to be powered with a continuous, non-degrading AC power from the output of the UPS power conditioner 20. This information provides a basis for calculating the size and mass required to store energy in the flywheel FW2.

If, upon loss of utility AC power, an AC power supply source is connected to the input of the UPS power conditioner 20 within 15 seconds from the time that the loss of the utility AC power occurs, it is necessary that the UPS power conditioner 20 be immediately powered by the standby AC power source or by the return of the utility AC power and continue to cooperate without interruption or deterioration.

As an example, the parameters set forth in Appendix A indicate that the UPS power conditioner supplying AC power to the critical load (named "VSDMG1") has an output capacity of 125 KVA. Using a load Power Factor of 0.8, which is normal, the KW output capacity of the UPS power conditioner 20 calculates to be 100 KW. The efficiency of the UPS power conditioner 20 is calculated by measuring its output power and dividing that figure by the measured input power, then multiplying by 100; for this example, with an input power measured at 111 KW, the efficiency was 90%. If power is fed from some other source to the input of the variable speed drive VSD1 during loss and then return of utility AC power, then the AC power required from the other source must be no less than 111 KW. The other power source in this case is the flywheel FW2 driving the AC generator ACG2 with the AC output being rectified to DC through the rectifier REC3 and passed to the DC bus DC1 of the variable speed drive that is part of the UPS power conditioner 20.

To obtain kinetic energy from the flywheel FW2, it must be driven by the AC motor ACM2. The motor ACM2 is powered by the input AC power source through the variable speed drive VSD2. By the design, the variable speed drive VSD2 and the AC motor ACM2 are not required to have the full power rating required of the AC generator ACG2 for output power.

Full kinetic energy in the flywheel FW2 can be obtained over an extended time. For example, using the parameter values from Appendix A, it is assumed that the AC motor ACM2, the flywheel FW2, and the AC generator ACG2 are driven up to a speed of 2200 RPM over an extended time period of 600 seconds by the variable speed drive VSD2. Such an extended time period reduces the cost and size of the variable speed drive VSD2 without loss of output performance.

Assuming now that the AC generator ACG2 must produce 111 KW of power to drive the variable speed drive VSD1, the AC power output from the generator ACG2 is rectified to DC current; therefore, the speed at which the generator ACG2 is driven is not critically important. The essential concern is the higher speed at which the windings of the generator ACG2 might be damaged. The inventors have confirmed with the manufacturer of an AC generator that a rated speed of 1800 RPM is conservative and that a speed of 2200 RPM can be tolerated on a continuous basis without damage. Therefore, a generator speed of 2200 RPM underpins the parameter values in Appendix A. In Appendix A, this parameter is denoted as N2 final speed, with a value of 2200 RPM.

It should be noted that the UPS power conditioning unit 20 for powering the critical load must be sized and configured for the requirements of the full rated load which, in the example, is 100 KW. In this case, the AC generator ACG1 is rated at 100 KW. The AC motor ACM1 must be sized to power the generator ACG1 at full rated output (100 KW). Therefore, the size (in horsepower, HP) of the motor ACM1 is determined by dividing the full rated output (100 KW) by the efficiency of the generator ACG1 (80%), yielding a power requirement of 125 KW. When divided by a conversion factor of 0.746 (watts/horsepower), the horsepower rating of the motor ACM1 is 167 HP. Conservatively, therefore, the AC motor ACM1 is rated at 200 HP.

Now, taking all known information regarding the standby DC power source into account, calculation produces the correct size and weight for the flywheel, the correct size of the AC motor ACM2 and the standby DC power source, and the ride-through time during which the speed of the generator (and flywheel) drops from 2200 RPM to 1200 RPM, the speed below which the voltage regulator VR2 can no longer force the generator ACG2 to the required output level.

Figure 4:
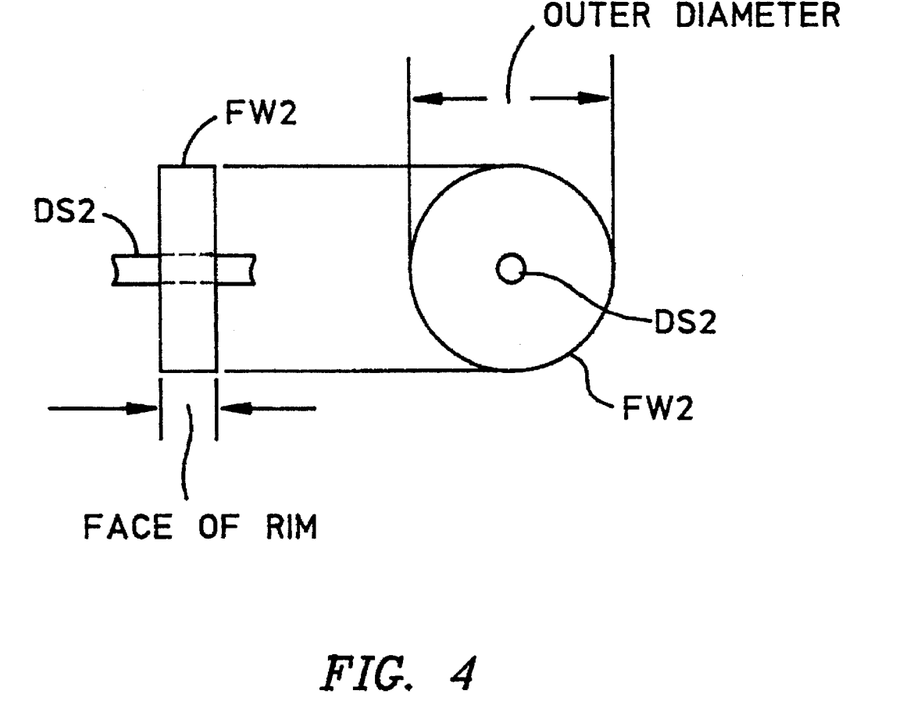
FIG. 4 is a diagram of a flywheel illustrating certain dimensions important to calculating flywheel size and weight.

For example, with reference to FIG. 4, and using well known calculations, the results in Appendix A show that a flywheel having a rim face of 6.6 inches and a diameter 36 inches, when being turned at 2200 RPM has a kinetic energy of 1770415 lbs/ft or 186.17 HP and a torque of 184451 lbs/ins. Further, the required output of the generator ACG2 is 111 KW, or 5311 lbs/ins of torque.

By calculation, for the speed of the flywheel FW2 and the generator ACG2 to drop from 2200 RPM to 1200 RPM with 111 KW applied required 15.7 seconds to elapse. Manifestly, the standby DC power source 24 does have the capacity of continuing to operate the UPS power conditioner 20 for a period of time in the range of one second to 15 seconds.

Attention must be paid to the point at which the AC generator ACG2, being driven by the kinetic energy in the flywheel FW2, experiences an output voltage drop due to speed drop and becomes unable to power the UPS power conditioner 20. It was learned during testing that as the flywheel's decreasing speed approaches 1200 RPM, the voltage regulator VR2 reaches the full forcing mode, at which time the field exciter winding of the AC generator ACG2 becomes saturated. At this point, the AC voltage from the generator ACG2 begins to decrease and, by the time that the speed of the flywheel FW2 drops to 1050 RPM the AC output voltage from the generator ACG2 shall have deteriorated to the point where it can no longer power the UPS power conditioner 20. When this occurs, automatic controls in the variable speed drive VSD1 signal a low DC bus voltage fault condition, stopping the drive.

The flywheel calculations in Appendix B refer to the condition in which the speed of a flywheel FW2 drops to 1050 RPM over a period of 18 seconds, at which time it is assumed that automatic shutdown of the variable speed drive VSD1 occurs, causing the contact K2 to open, thereby shedding the critical load, and stopping the UPS.

TABLE I

EQUIPMENT MANUFACTURERS

| | |
|---|---|
| 1. Standby Generating Set (SBG1) | Onan |
| | Kohler |
| | Kummins |
| | Caterpillar |
| 2. Automatic Transfer Switch (ATS1) | ASCO |
| | Zenith |
| 3. AC Generators (ACG1 & ACG2) | Kato |
| | Lima |
| 4. AC Induction Motors (ACM1 & ACM2) | various |
| 5. Variable Speed Drives (VSD1 & VSD2) | Yaskawa |
| | Magnetek |
| | ABB Electric |
| 6. Micro-Processor (PLC1 & PLC2) | IDEC |

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

APPENDIX A

FLYWHEEL CALCULATIONS

| | | |
|---|---|---|
| VSDMG1 SYSTEM RATING KVA | 125 | KVA |
| LOAD POWER FACTOR | 0.8 | PF |
| VSDMG1 SYSTEM RATING KW | 100 | KW |
| VSDMG1 SYSTEM EFFICIENCY | 0.9 | EFF % |
| VSDMG1 SYSTEM INPUT KW | 111 | KW |
| ACG2 OUTPUT KW | 111 | KW |
| ACG2 EFFICIENCY % | 0.8 | EFF % |
| FW2 FLYWHEEL REQUIRED KW | 139 | KW |
| N2 FINAL SPEED | 2200 | RPM |
| N2 FINAL HERTZ | 73.33 | HERTZ |
| N1 INITIAL SPEED | 0 | RPM |
| N1 INITIAL HERTZ | 0 | HZ |
| TIME CHANGE N1-N2 | 600 | SECONDS FROM 0 TO 2200 RPM |
| FW2 RIDE-THROUGH HZ | 40 | HZ. VR2 REG FULL FORCING |
| RIDE THROUGH RPM N3 | 1200 | SPEED DROP FROM 2200 RPM |
| FACE OF RIM | 6.6 | INCH |
| D OUTER DIAMETER | 36 | INCH |
| d INNER DIAMETER | 0 | |
| D^4 | 1679616 | |
| d^4 | 0 | |
| d^4 – d^4 = | 1679616 | |
| WR^ GENERATOR (ACG2) | 5 | LBS/FT |
| WR^2 MOTOR (acm2) | 2 | LBS/FT |
| WR^2 FLYWHEEL | 2138.3863142 | LBS/FT |
| WR^2 TOTAL | 2145.3863142 | LBS/FT |
| K WEIGHT OF FW2 PER CUBE/INS | 0.283 | LBS/CUBIC/FT |
| WEIGHT OF RIM (FLYWHEEL) | 1901.46528 | LBS |
| KE KINETIC ENERGY FT/LBS | 1770415.6942 | LBS/FT |
| TORQUE TO ACCELERATE LBS/FT | 307.41955626 | LBS/FT |
| ACCELERATION TORQUE LBS/FT | 25.618296355 | LBS/FT |
| MOTOR HP REQUIRED | 8.7834122332 | HP |
| ACG2KVA | 139 | KVA TO POWER VSDMG1 |
| ACG2 KW | 111 | KW TO POWER VSDMG1 |
| ACG2 GEN EFFICIENCY % | 0.8 | EFF % |
| ACG2 FLYWHEEL HP REQUIRED | 186.17813524 | HP |
| ACG2 TORQUE REQUIRED | 444.28873182 | LBS/FT |
| ACG2 TORQUE LBS/INS | 5331.4647819 | LBS/INCH |
| TORQUE AVAILABLE | 184451.73375 | LBS/INCH |
| DE-ACCELERATION TIME | 34.596821193 | SECONDS |
| DE-ACCELERATION RPM/SEC | 65.589657204 | RPM/SEC |
| DE-ACCELERATION HZ/SEC | 2.1196552401 | HERTZ/SECOND |
| RIDE-THROUGH TIME SEC | 15.7258278148 | FROM 2200 TO 1200 RPM N2-N3 |
| D^2 | 1296 | |
| d^2 | 0 | |
| D^2 + D^2 = | 1296 | |
| RADIUS OF GYRATION FEET | 1.0606873243 | |

APPENDIX B

FLYWHEEL CALCULATIONS

| | | |
|---|---|---|
| VSDMG1 SYSTEM RATING KVA | 125 | KVA |
| LOAD POWER FACTOR | 0.8 | PF |

APPENDIX B-continued

FLYWHEEL CALCULATIONS

| | |
|---|---|
| VSDMG1 SYSTEM RATING KW | 100 KW |
| VSDMG1 SYSTEM EFFICIENCY | 0.9 EFF % |
| VSDMG1 SYSTEM INPUT KW | 111 KW |
| ACG2 OUTPUT KW | 111 KW |
| ACG2 EFFICIENCY % | 0.8 EFF % |
| FW2 FLYWHEEL REQUIRED KW | 139 KW |
| N2 FINAL SPEED | 2200 RPM |
| N2 FINAL HERTZ | 73.33 HERTZ |
| N1 INITIAL SPEED | 0 RPM |
| N1 INITIAL HERTZ | 0 HZ |
| TIME CHANGE N1–N2 | 600 SECONDS FROM 0 TO 2200 RPM |
| FW2 RIDE-THROUGH HZ | 35 HZ POINT OF VSD1 UV FAULT |
| RIDE THROUGH RPM N3 | 1050 SPEED DROP FROM 2200 RPM |
| FACE OF RIM | 6.6 INCH |
| D OUTER DIAMETER | 36 INCH |
| d INNER DIAMETER | 0 |
| $D^4$ | 1679616 |
| $d^4$ | 0 |
| $d^4 - d^4 =$ | 1679616 |
| WR^ GENERATOR (ACG2) | 5 LBS/FT |
| $WR^2$ MOTOR (acm2) | 2 LBS/FT |
| $WR^2$ FLYWHEEL | 2138.3863142 LBS/FT |
| $WR^2$ TOTAL | 2145.3863142 LBS/FT |
| K WEIGHT OF FW2 PER CUBE/INS | 0.283 LBS/CUBIC/FT |
| WEIGHT OF RIM (FLYWHEEL) | 1901.46528 LBS |
| KE KINETIC ENERGY FT/LBS | 1770415.6942 LBS/FT |
| TORQUE TO ACCELERATE LBS/FT | 307.41955626 LBS/FT |
| ACCELERATION TORQUE LBS/FT | 25.618296355 LBS/FT |
| MOTOR HP REQUIRED | 8.7834122332 HP |
| ACG2KVA | 139 KVA TO POWER VSDMG1 |
| ACG2 KW | 111 KW TO POWER VSDMG1 |
| ACG2 GEN EFFICIENCY % | 0.8 EFF % |
| ACG2 FLYWHEEL HP REQUIRED | 186.17813524 HP |
| ACG2 TORQUE REQUIRED | 444.28873182 LBS/FT |
| ACG2 TORQUE LBS/INS | 5331.4647819 LBS/INCH |
| TORQUE AVAILABLE | 184451.73375 LBS/INCH |
| DE-ACCELERATION TIME | 34.596821193 SECONDS |
| DE-ACCELERATION RPM/SEC | 65.589657204 RPM/SEC |
| DE-ACCELERATION HZ/SEC | 2.1196552401 HERTZ/SECOND |
| RIDE-THROUGH TIME SEC | 18.084701987 FROM 2200 TO 1050 RPM N2–N3 |
| $D^2$ | 1296 |
| $d^2$ | 0 |
| $D^2 + D^2 =$ | 1296 |
| RADIUS OF GYRATION FEET | 1.0606873243 |

We claim:

1. An uninterruptible power system, including:

a first connection for receiving utility AC power;

an uninterruptible power system (UPS) power conditioning unit connected to the first connection;

a critical load connection on the UPS power conditioning unit for providing conditioned AC power to a critical load;

a standby DC power connection on the UPS power conditioning unit;

a standby DC power source coupled to the standby DC power connection for providing standby DC power to drive the UPS power conditioning unit during interruptions in utility AC power;

a first variable speed drive in the standby DC power source with a first motor driven output;

a flywheel-motor generator in the standby power source for generating AC power;

the flywheel-motor generator having a motor drive input connected to the first motor drive output; and a rectifier connected to the flywheel motor-generator and to the standby power connection for producing the standby DC power by rectifying the AC power generated by the flywheel motor-generator.

2. The uninterruptible power system of claim 1, further including:

a standby AC generator; and a transfer switch connected to the first connection, to the standby AC generator, and to the UPS power conditioning unit for assuming a first state in which the first connection is connected to the UPS power conditioning unit, and a second state in which the standby AC generator is connected to the UPS power conditioning unit.

3. The uninterruptible power system of claim 1, wherein the UPS power conditioning unit comprises:

a variable speed drive having an AC input coupled to the first connection, a DC input, and a motor drive output; and the standby power connection comprises the DC input.

4. The uninterruptible power system of claim 1, further including:

a standby AC generator; and a transfer switch connected to the first connection, to the standby AC generator, and to the UPS power conditioning unit for assuming a first state in which the first connection is connected to the UPS power conditioning unit, and a second state in which the standby AC generator is connected to the UPS power conditioning unit.

5. The uninterruptible power system of claim 4, wherein the UPS power conditioning unit comprises:
   a second variable speed drive having an AC input coupled to the transfer switch, a DC input, and a motor drive output; and
   the standby power connection comprises the DC input.

6. The uninterruptible power system of claim 5, wherein the UPS power conditioning unit further includes a motor-generator coupled to the motor drive output of the second variable-speed drive, and an output for providing AC power to the critical load connection.

7. The uninterruptible power system of claim 1, wherein:
   the flywheel motor-generator includes an AC motor, a flywheel, an AC generator, and means coupling the AC motor, flywheel, and AC generator for common rotary operation;
   the first variable speed drive is connected to the first connection, the first motor drive output causes rotary operation of the AC motor in response to the utility AC power;
   the AC generator generates the AC power in response to rotary operation by either the AC motor or the flywheel; and
   the flywheel stores kinetic energy in response rotary operation of the AC motor, the kinetic energy being of a magnitude for causing the AC generator to generate the AC power in response to interruption of the utility AC power.

8. The uninterruptible power system of claim 7, wherein the flywheel stores kinetic energy for causing rotary operation of the AC generator sufficient to maintain operation of the UPS power conditioning unit at a predetermined level for a period of time within the range of one second to 15 seconds.

9. A standby DC power source for a system that provides power to a critical load, the system having an input for receiving standby DC power when a utility AC power signal is interrupted, the standby DC power source including:
   a variable-speed drive for providing a motor drive output in response to an AC power signal;
   a flywheel motor-generator unit for storing kinetic energy in response to the AC power signal and for producing AC power on an output in response to the kinetic energy in response to interruption of the AC power signal;
   the flywheel motor-generator unit having an AC motor connected to the motor drive output, an AC generator, a flywheel, and a shaft driven by the AC motor for rotating the flywheel and driving the AC generator;
   a rectifier connected to the output for rectifying an AC power waveform; and
   a DC output connected to the rectifier for providing a standby DC power signal.

10. The standby DC power source of claim 9, wherein the system is an uninterruptible power system (UPS) for driving the critical load in response to a predetermined input power magnitude, the flywheel motor-generator unit producing the AC power at the input power magnitude for a predetermined period of time.

11. The standby power source of claim 10, wherein the predetermined period of time is within the range of one second to 15 seconds.

12. The standby power source of claim 10, the flywheel for driving the AC generator when the utility AC power signal is interrupted, the flywheel providing kinetic energy at a magnitude sufficient to cause the AC generator to produce the AC power at the input power magnitude for a period of time in the range of one second to 15 seconds.

13. A method of providing uninterruptible power in an UPS (uninterruptible power system) that includes a first variable speed drive responsive to utility AC power, or to standby DC power for producing a motor drive signal, and an AC motor generator responsive to the motor drive signal for producing conditioned AC power for a critical load, the method including the steps of:
   storing kinetic energy in a flywheel of a flywheel motor-generator that is mechanically uncoupled and separate from the AC motor-generator;
   providing a drive signal to operate the flywheel motor-generator from a second variable speed drive;
   detecting an interruption in the utility AC power;
   decoupling the UPS from the utility AC power in response to the interruption;
   generating standby AC drive power from the flywheel motor-generator in response to the kinetic energy stored in the flywheel;
   rectifying the standby AC drive power to produce the standby DC power; and
   operating the variable speed drive in response to the standby DC power during the interruption in the utility AC power.

14. The method of claim 13, wherein the operating step is performed for a period of time in the range of one second to 15 seconds.

15. The method of claim 13, further including the steps of:
   generating standby utility AC power in response to the interruption in the utility AC power; and
   applying the standby AC power to the first and second variable speed drives.

16. The method of claim 15, wherein the step of applying is performed within a period of time within the range of one second to 15 seconds after the step of generating standby utility AC power.

17. The standby power source of claim 9, wherein the system is for providing power to the critical load in response to a predetermined input power magnitude, the means producing the AC power at the input power magnitude for a predetermined period of time.

18. The standby power source of claim 17, wherein the predetermined period of time is within the range of one second to 15 seconds.

19. The standby power source of claim 7, the flywheel for driving the AC generator when the utility AC power signal is interrupted, the flywheel providing kinetic energy at a magnitude sufficient to cause the AC generator to produce the AC power at the input power magnitude for a period of time in the range of one second to 15 seconds.

20. The standby power source of claim 9, wherein the system is an uninterruptible power system (UPS).

* * * * *